(12) United States Patent
Lortz

(10) Patent No.: US 6,957,261 B2
(45) Date of Patent: Oct. 18, 2005

(54) RESOURCE POLICY MANAGEMENT USING A CENTRALIZED POLICY DATA STRUCTURE

(75) Inventor: Victor B. Lortz, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 714 days.

(21) Appl. No.: 09/908,437

(22) Filed: Jul. 17, 2001

(65) Prior Publication Data
US 2003/0018786 A1 Jan. 23, 2003

(51) Int. Cl.⁷ .............................................. G06F 13/00
(52) U.S. Cl. ...................................................... 709/226
(58) Field of Search ................................ 709/223, 226; 713/150, 156

(56) References Cited

U.S. PATENT DOCUMENTS 6,353,886 B1 * 3/2002 Howard et al. ............. 713/156

* cited by examiner

Primary Examiner—Robert B. Harrell
(74) Attorney, Agent, or Firm—Fish & Richardson P.C.

(57) ABSTRACT

Managing policies includes receiving policy data associated with a resource from a resource owner over a network, authenticating the resource owner to determine whether to accept the received policy data, and storing the received policy data in a centralized data structure if the resource owner is authenticated.

19 Claims, 7 Drawing Sheets

```
        22a              30
    ┌───┴───┐    ┌───────┴────────┐
    < devicepolicy  policyidentifier ="123" >

┌  <principal>
        │      < ds:keyinfo Id="xyz789">                      ┐
    34 ─┤           information about public key placed here  ├─ 36
        │      </ds:keyinfo>                                  ┘
        └  </principal>

42                    46
      ┌───────┴────────┐    ┌────────┴────────┐
      ┌ <resource name="PC/Media"  inherit ="editor">                ┐
      │     <ACL>                                                    │
   40─┤         <ACE subject = "xyz789" permission="editor"          ├─ 41
      │         </ACE>    └────┬────┘ └────────┬────────┘            │
      │     </ACL>  \         45              44                     │
      │            43                                                │
      └ </resource>                                                  ┘

</devicepolicy>                    FIG. 3A
```

22b

```
< userpolicy policyidentifier ="456"> devicepolicy policyidentifier ="981">

<principal>
            < ds:keyinfo Id="user123">
                information about public key placed here
            </ds:keyinfo>
        </principal>                                                    } 34

<resource name="devicepolicy" >
            <ACL>
                <ACE subject = "securedevice" permission="editor" >
                </ACE>
            </ACL>
        </resource>                                                     } 42a <resource name="userpolicy" >
            <ACL>
                <ACE subject= "securedevice" permission="reviewer" >
                </ACE>
            </ACL>
        </resource>                                                     } 42b </devicepolicy>

<principalgroup name="securedevice">
        <member principal = "user123">
    </principalgroup>                                                   } 65

<resourcegroup name="guest">
        <member policyid="123" resource="PC/Media">
            <ACL>
                <ACE subject="user123" permission="owner" >
                </ACE>
            </ACL>
        </member>                                                       } 66
    </resourcegroup>

</userpolicy>
```

- 60 brackets the devicepolicy block
- 61 brackets the principalgroup and resourcegroup blocks

FIG. 3B

RESOURCE POLICY MANAGEMENT USING A CENTRALIZED POLICY DATA STRUCTURE

BACKGROUND

The invention relates to resource policy management.

Policy data can include rules and access control information specifying permission levels associated with accessing a resource and to whom the permission is granted. It is important for a policy management system to allow the resource owner to be able to participate in the definition and the administration of policy data related to resources associated with a resource device.

In addition, the policy management system should be able to handle resources that nay be distributed over a loosely coupled network such as a network using universal plug and play (UPnP) protocols. Furthermore, since the resources are distributed over a network and may be associated with different resource owners, the policy management system should provide security features for preventing unauthorized access to the resources and to policy data associated with the resources.

BRIEF DESCRIPTION OF THE DRAWINGS

FIGS. 3A–3B show data structures.

DETAILED DESCRIPTION

Figure 1:
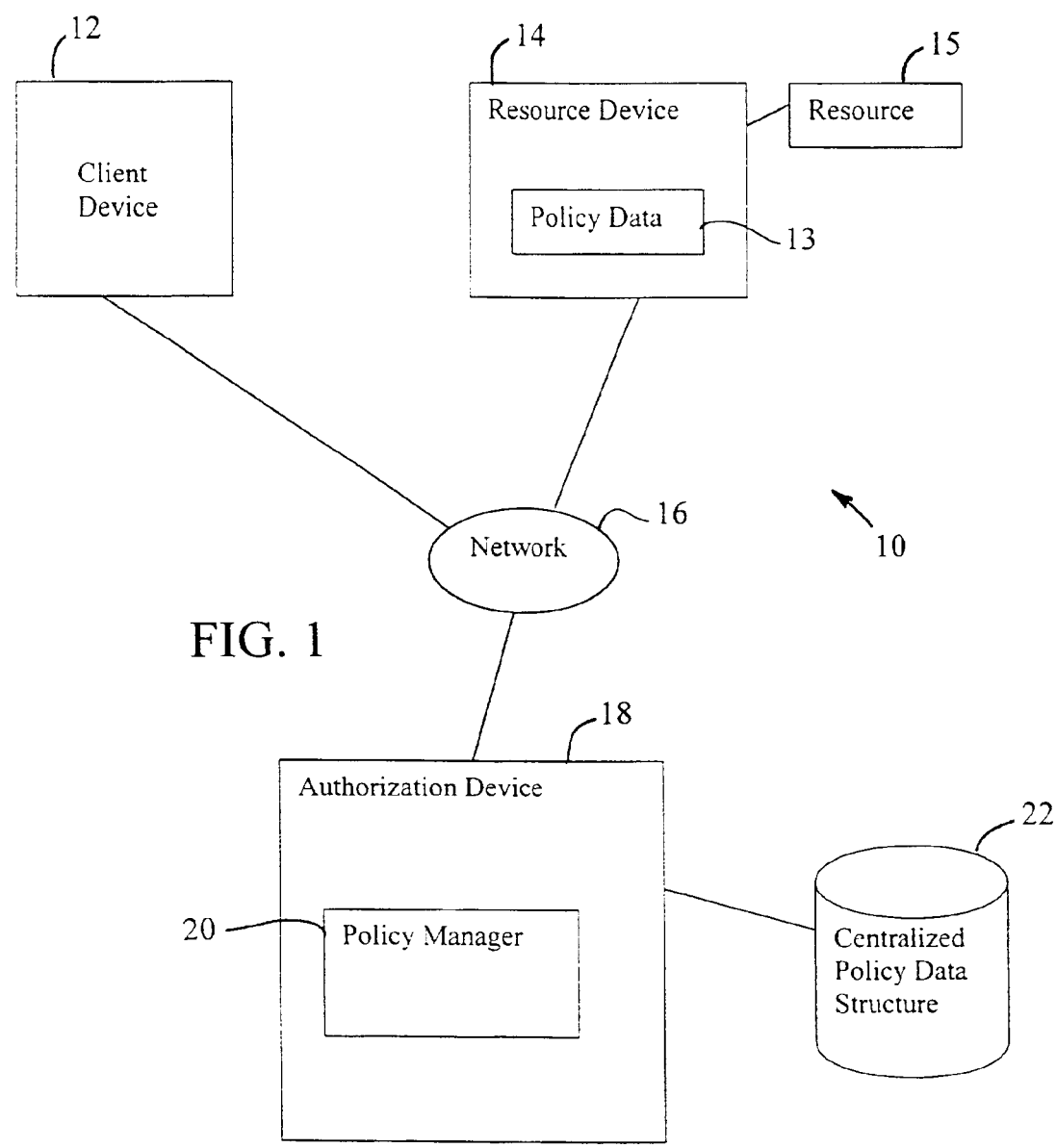
FIG. 1 illustrates a policy management system.

FIG. 1 illustrates a system 10 with a client device 12 that can request access to a resource device 14 over a network 16. The resource 14 device includes one or more resources 15 and policy data 13 associated with the resources. The resource device 14 can send the policy data 13 associated with the resource 15 to an authorization device 18 to be stored in a centralized policy data structure 22 such as a database.

The authorization device 18 includes a policy manager 20 that manages the centralized policy data structure 22. The centralized policy data structure 22 includes authorization data and access control information or controlling access to resource 15. The resource device 14 can determine whether to grant a client device 12 access to the resource 15 by evaluating the policy data 13 associated with the resource 15. The operation of the system 10, including the authorization device 18 and the policy manager 20, is discussed in detail below.

The resource device 14 can be implemented, for example, as a personal computer (PC) configured to include a resource 15 such as a multimedia resource for playing videos over the network 16. The client device 12 can request access to the multimedia resource 15 to play a video. Before the client device 12 is permitted to access the multimedia resource 15, a determination is made as to whether the client device is authorized to access the resource. The resource device 14 can make this determination locally by evaluating the resource policy data 13 associated with the multimedia resource. Alternatively, the resource device 14 can query the policy manager 20 to make the authorization determination. The system 10 can include multiple client devices 12, resource devices 14 and authorization devices 18.

Figure 2:
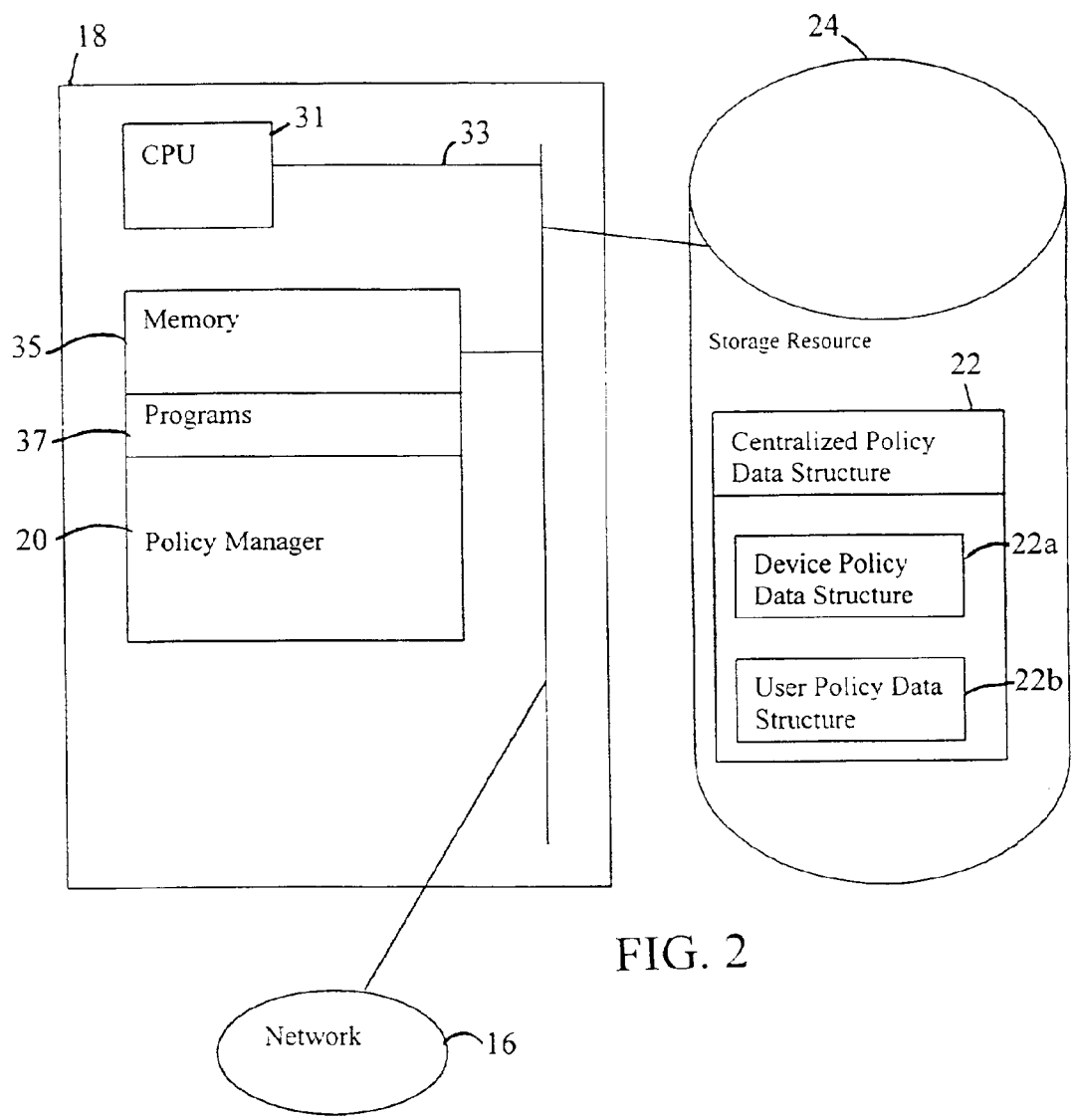
FIG. 2 illustrates an authorization device.

FIG. 2 shows an authorization device 18 having a policy manager 20. The authorization device 18 includes a central processing unit (CPU) 31 and a memory 35 connected to a bus 33. The CPU 31 can include, for example, an Intel Pentium® processor, or other processor. The CPU 31 is capable of processing data and executing programs residing in memory 35. Such programs can include an operating system, device drivers and other programs for the operation of the authorization device 18. The memory 35 can include static random access memory (SRAM), dynamic random access memory (DRAM) or other memory.

The policy manager 20 can be implemented as a program that is executed by the CPU 31. The policy manager 20 manages the centralized policy data structure 22 which can be stored in a storage resource 24. Such a storage resource 24 can include, for example, a hard disk or an optical drive. The policy manager 20 includes the capability of allowing a user to access and edit the policy data structure 22 either locally or remotely over the network.

The centralized policy data structure 22 includes device policy data structure 22a and user device policy data structure 22b. The device policy data structure 22a can include authorization and policy rules for controlling access to the resources 15 associated with each resource device 14. The user policy data structure 22b also can include authorization and policy rules. The policy rules can reflect the preferences of interested entities such as the owner or manufacturer of the resource device 14 and the owner of the network. The authorization device 18 can be coupled to the network 16 using wired or wireless technologies. Such networks 16 can include, for example, the Internet, Ethernet, local area network (LAN), or peer-to-peer network.

FIG. 3A shows an example of a device policy data structure 22a associated with a particular resource 15 and resource device 14. An entity responsible for the resource device 14 such as a resource owner can send policy data 13 associated with the resource device 14 to the authorization device 18. The authorization device 18 merges the received policy data 13 with the device policy data structure 22a. The device policy data 13 and the device policy data structure 22a can be organized according to various formats including an extensible markup language (XML) or other format that can be communicated over a network.

Each device policy data structure 22a is identified by a unique policy identifier attribute 30 which may prevent unwanted collisions between device policy structures belonging to other resources and resource devices. As discussed earlier, the authorization device 18 can be configured to store the device policy data structure 22a in the centralized policy data structure 22.

As shown in FIG. 3A, each device policy data structure 22a is organized into a first portion 34 and a second portion 40. The first portion 34 corresponds to principal information specifying designated principals that can access the device policy data structure 22a. A principal can include an entity that created the contents of the device policy structure 22a. Examples of such an entity include the resource device 14, a client device 12, or other entity with an interest in the resource device. Although one principal entry is listed in the first portion 34, multiple principal entries can be specified to access the resources defined in the device policy data structure 22a.

The policy manager 20 can use public/private key cryptography techniques to provide access control to the device policy data structure 22a. Each principal entry can be identified by a key information attribute 36 containing the public/private key information associated with the principal entry. The key information attribute 36 manages access to the device policy data structure 22a and allows secure communication with the authorization device 18. For example, a principal could use the private key corresponding to the key information attribute 36 to sign a request digitally and then send the digitally signed request to the authorization device 18. The authorization device 18 authenticates the received digitally signed request to determine whether to grant the principal access to the resource and the device policy data structure 22a.

The second portion 40 includes data and resource operations provided by the resource device 14. The second portion 40 includes a resource name attribute 42 identifying the name of a resource 15 associated with the resource device 14. The actual name of the resource referenced by the resource name attribute 42 does not have to be unique because the resource name attribute is referenced with respect to the policy identifier attribute 30.

Each resource name attribute 42 also can include an access control last (ACL) attribute 41. In turn, each ACL attribute 41 can contain an access control entry (ACE) 43. These attributes contain information for controlling access to the resource 15 and the device policy data structure 22a. Although one ACL attribute 41 and one ACE attribute 43 are illustrated, the policy manager 20 can manage more than one ACL attribute, and each ACL attribute can contain more than one ACE attribute.

Each ACE attribute 43 can include a subject attribute 45 specifying the public/private key information associated with a particular principal identified by the first portion 34 and who may be permitted to access a resource identified in a resource name attribute 42. For example, the key information in the subject attribute 45 corresponds to the key information in the key information attribute 36. As a result, a principal having key information specified in the key information attribute 36 can access the resource specified in the resource name attribute 42.

In addition, the ACE attribute 43 can include an access permission level attribute 44 that can be set to one of four access levels of permission in decreasing order of authority: (1) "owner" level which is the highest level of access, (2) "editor" level which allows access for editing, (3) "reviewer" level which allows access for reading only, and (4) "none" level which denies all access. The interpretation of the values specified in the access permission level attribute 44 can depend on the particular resource device 14. The permission level attribute 44 can be arranged to provide a hierarchy of permission levels. For example, a principal with a high access permission level also may be granted the privileges associated with a lower access permission level.

A principal, such as a resource owner, that is responsible for the resource device 14 can define the resource 15 identified in the resource name attribute 42. Resource names can be hierarchically structured to allow inheritance of an access permission level from a parent node in the hierarchy. For example, first and second resource can be identified by resource name attributes 42 of "PC", and "PC/media" respectively. The ACE attribute 43 associated with the first resource "PC" is evaluated if the ACE attribute associated with the second resource "PC/Media" does not grant the requested permission. Processing of an ACL attribute 41 can proceed in a bottom-up fashion. A parent node cannot revoke privileges granted by a child node by specifying an ACE attribute with a lower level of access than that granted by the parent node.

The resource names and their corresponding inheritance structure are within the scope of a single device policy structure 22a. ACLs cannot inherit across device policy structures 22a. However, as discussed below, resources 15 can inherit ACLs from resource groups defined in the user policy data structure 22b defined by using an inheritance attribute 46 with an access level constraint. These restrictions reduce the likelihood that access control policies defined by a resource device 14 will be compromised by an unauthorized entity.

FIG. 3B illustrates an optional user policy data structure 22b associated with resources 15 and resource devices 14. The user policy data structure 22b includes a first portion 60 and a second portion 61. The first portion 60 is organized based on the device policy structure previously discussed. For example, the first portion 60 includes a principal attribute 34 and resource attributes 42a and 42b. The second portion 61 includes at least one principal group attribute 65 containing references to principal information 34 specified in the first portion 60. The second portion 61 also includes at least one resource group attribute 66 containing references to ACLs associated with resources 15.

As discussed below, use of a principal group attribute 65 and a resource group attribute 66 can allow resources and principals that have been defined by different resource devices 14 to be classified and organized according to the preferences of a single user or network owner. As a result, the administration of the policies included in the centralized policy data structure 22 is simplified.

A resource group attribute 65 permits the construction of groups of resources such that one ACL can apply to all the resources referenced in the resource group. In addition, the use of a resource group 66 allows a user such as a resource holder to author ACLs that can be included in the resource defined in the device policy data structure 22a.

The policy manager 20 can process resource information in a resource group 66 contained in a user policy data structure 22b in a manner similar to how it processes resource information in a resource device policy data structure 22a. However, a resource group 66 can include explicit references to externally defined resources. The explicit references can cause the ACLs in the resource group 66 (and any of the parent nodes) to be processed after the resource's ACLs are processed. If the resource's ACL does not specify policy data to resolve a specific query, then the policy data of the resource group 66 is inherited. This external inheritance only occurs if the resource in the device policy data structure 22a has the inheritance attribute 46 set.

The inheritance attribute 46, however, can place a limit on the privilege level that can be inherited. For example, a resource group 66 may grant "owner" privileges to a principal, but if a resource included in the resource group 66 limits the inheritance attribute to "editor," that principal will have only "editor" privileges for the resource.

Since the ACLs defined in resource group ACLs in the user policy data structure 22b may not inherit from the ACLs of resources defined in the device policy data structure 22a, the chain of trust from a resource device 14 to a policy manager 20 does not extend arbitrarily to other devices on the network 16. As a result, the resource user or holder must explicitly empower a key under the control of another resource device to access a resource group.

If a resource device 14 delegates authorization processing to the policy manager 20, the resource device should be able to trust the policy manager to guard its security information such as public/private key data. However, the trust relationship for empowering other keys is between a resource device 14 and the policy manager 20, and not between different resource devices.

Figure 4A:
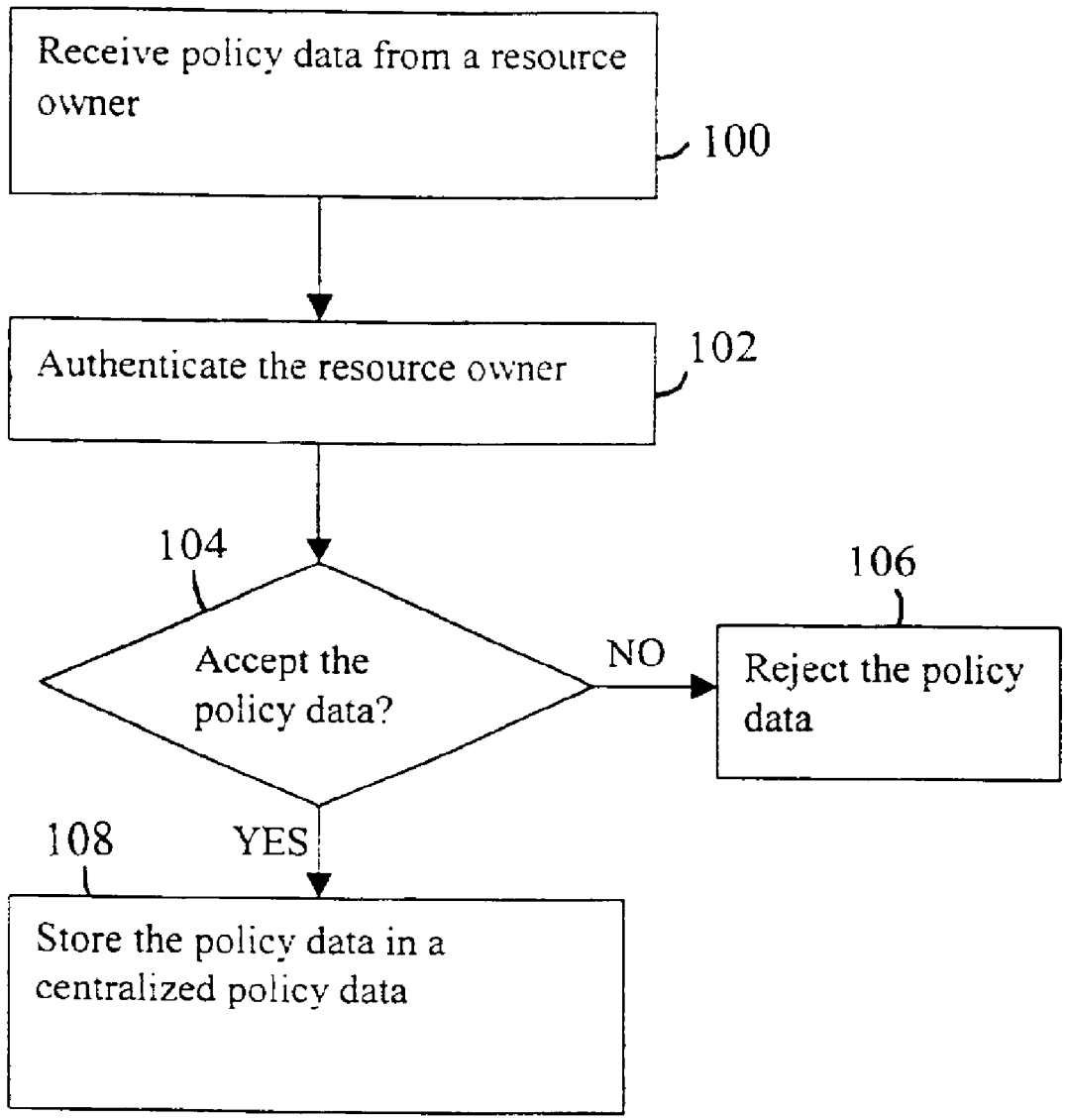
FIGS. 4A, 4B, and 4C are flow charts of methods for resource policy management.

FIG. 4A illustrates the processing requests to add and edit policy data. A policy manager 20 receives 100 policy data 13 from the resource device 14 associated with the resource 15 over the network 16. In one embodiment, the policy data 13 is sent over the network 16 in an XML format. The policy data 13 includes, for example, authorization policies, policy rules, or other policy-related data. The policy data 13 does not have to be received over the network, but can be edited locally directly through a user interface exposed by the authorization device. The policy data can grant supplementary conditional access to the resources of the resource owners.

Once the policy manager 20 has received the policy data 13, the policy manager authenticates 102 the resource owner. Such authentication can include determining whether to accept a request to add the policy data or to accept a request to edit the policy data already stored in the centralized policy data structure 22. Authentication can be accomplished using authentication techniques such as public key cryptography.

The resource owner can digitally sign policy data 13 in an XML format using a private key of a pubic/private key pair assigned to the resource owner. The policy manager 20 then can use the public key of the public/private key pair to authenticate the document sent by the resource owner. The authentication technique reduces the likelihood that an unauthorized user will add to or edit the policy data stored in the centralized policy data structure 22.

The policy manager 20 then determines 104 whether to accept the policy data 13 based or the results of authenticating the resource owner. If the authentication results are unsuccessful, then the resource owner is not authorized and the policy data 13 is rejected 106.

Otherwise, if the results of the authentication evaluation (block 102) reveal that the resource owner is authorized, then the policy manager 20 stores 108 the received policy data 13 in the centralized policy data structure 22. As discussed earlier, the resource owner can send two types of policy data 13 including device policy data 22a and user policy data 22b. The policy manager 20 can handle both types of policy data and merge them into the centralized policy data structure 22.

Figure 4B:
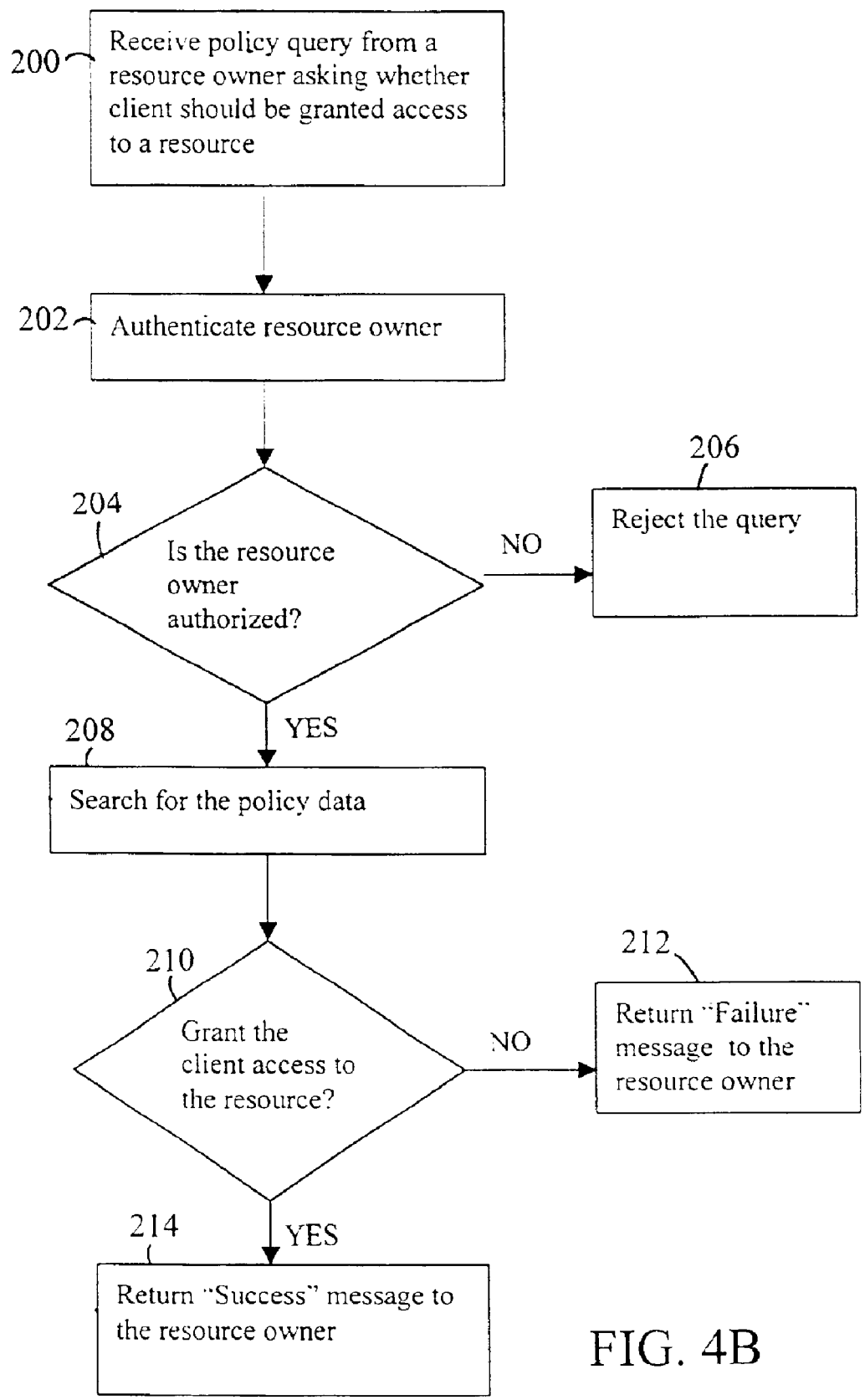

FIG. 4B illustrates a method for evaluating policy queries. The policy manager 20 receives 200 a policy query from a resource owner associated with the resource device 14. The policy query can include a query from a resource device 14 asking whether a request from a client to access a resource should be granted. The policy query can include a policy identifier, a resource name, an access permission level, and client credentials associated with the client seeking access to the resource. The information included in the policy query can be found in the centralized policy data structure 22.

Once the policy manager 20 receives (block 200) the policy query, it authenticates 202 the resource owner to determine whether to accept the policy query. As discussed earlier, an authentication technique that uses a public/private key pair can be used to determine the authenticity of the resource owner. The resource owner digitally signs the policy query using the private key of a public/private key pair assigned to the resource owner. The policy manager 20 then can use the public key of the public/private key pair to authenticate the policy query sent by the resource owner. Authentication reduces the likelihood that an unauthorized policy query is processed by the policy manager 20.

The policy manager 20 then determines 204 whether to accept the policy query based on the results of the authentication process (block 202). It the resource owner is not authorized then the policy query is rejected 206.

Otherwise, if the results of the authentication process (block 202) reveal that the policy query from the resource owner is valid, then the policy manager 20 searches 208 the centralized policy data structure 22 for the policy data specified by the policy identifier accompanying the policy query. Alternatively, the resource owner can send policy data 13 along with the policy query. In that case, the policy manager 20 can use the policy data 13 to evaluate the policy query.

The policy manager 20 evaluates 210 the policy data found during the search process (block 208) to determine whether the policy data grants the client access to the resource based on the client credentials and the access permission level. If the results of the evaluation reveal that the policy data does not grant the client access to the resource, then the policy manager 20 performs an additional search for a user policy data structure 22b associated with the resource name. As discussed earlier, the user policy data structure 22b may reference resource information in the device policy data structure 22a.

The policy manager 20 then determines whether the user policy data structure 22a grants the client access to the resource based on inheritance at least at the access permission level. If the policy data does not grant the client access to the resource, then the policy manager 20 performs a further search that includes searching for a user policy data structure 22a associated with the resource name. The policy manager 20 then determines whether the policy data grants the client access to the resource based on the client credentials at least at the access permission level.

If the results of the policy data evaluation procedures (block 210) indicate that the policy data does not grant access to the client, the policy manager returns 212 a "failure" message to the resource owner. Otherwise, if the policy data evaluation procedures (block 210) indicate that the client should be granted access to the resource, then the policy manager 20 returns 214 a "successful" message to the resource owner. The resource owner receives the message and can take appropriate action such as notifying the client of the status of the resource request.

Figure 4C:
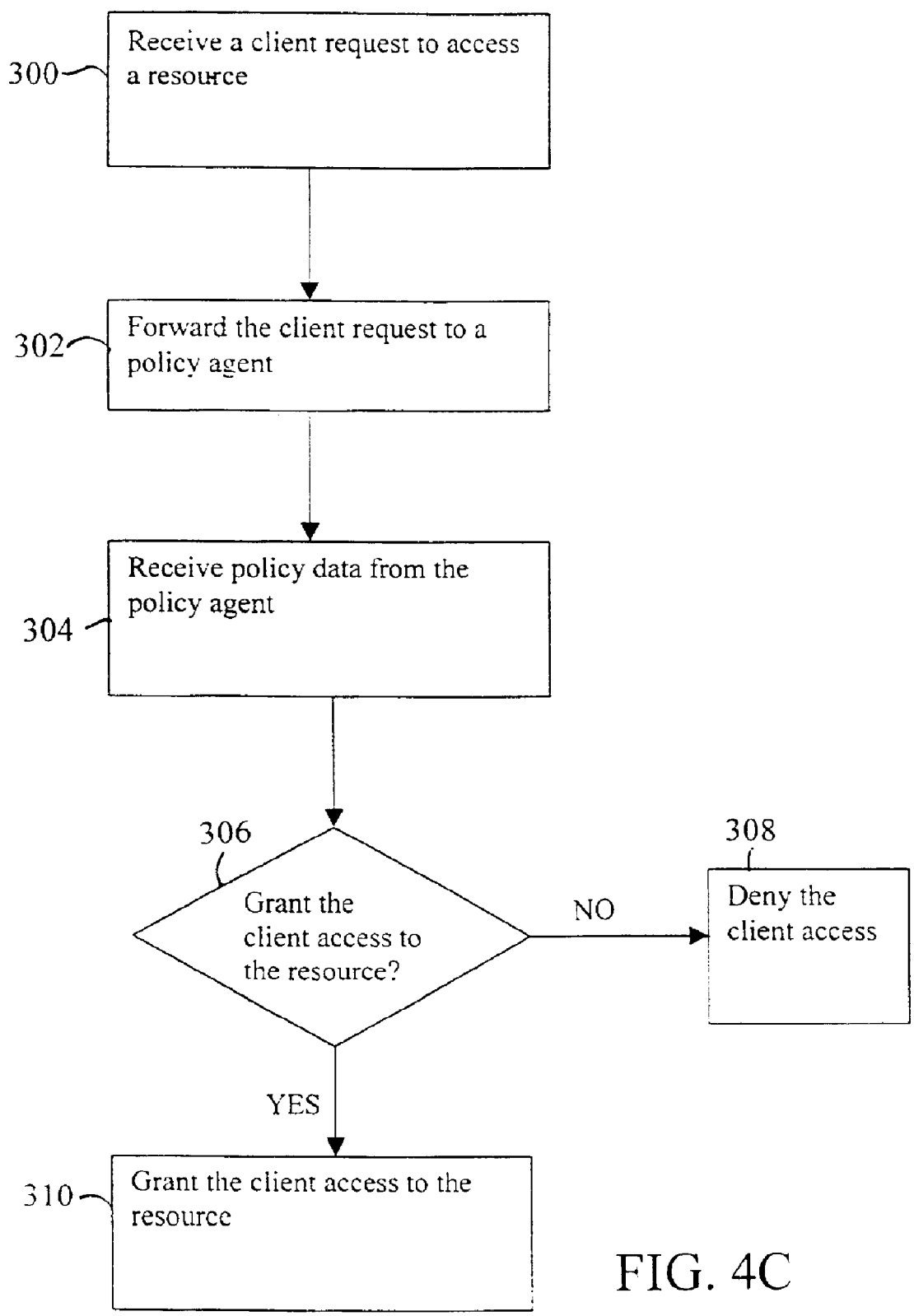

FIG. 4C illustrates a method of evaluating a resource request from a client device 12. The resource device 14 receives 300 a resource request from the client device 12 over the network 16. The resource request can include, for example, a request to access a resource 15 associated with the resource device 14.

Once the resource device 14 receives the resource request (block 300) from the client device 12, the resource device forwards 302 the request to the policy manager 20 associated with the authorization device 18. The policy manager 20 searches for policy data in the centralized policy data structure 22 based on the resource request. Once the policy manager 20 finds the policy data in the centralized policy data structure 22, it retrieves the policy data and sends it to the resource device 14.

The resource device 14 subsequently receives 304 the policy data from the policy manager 20 over the network 16. The resource device 14 evaluates 306 the received policy data to determine whether to grant the client access to the resource associated with the resource request. Evaluating the resource request includes examining the information accompanying the request such as the credentials of the client and the resource the client is seeking to access. Information in the client request is compared to information in the policy data received from the policy agent. The resource device grants 310 the client access to the resource if the evaluation results indicate that the client is permitted to access to the resource. Otherwise, the resource request from the client is denied 308.

Alternatively, instead of having the resource device 14 evaluate the policy data as discussed above, the resource device can receive a signal from the policy manager 20 indicating whether to grant access to the client. As before, the policy manager 20 evaluates the resource request and determines whether to grant the client access to the resource associated with the device.

In yet another embodiment, the resource device 14 can be configured to operate in a hybrid mode. In the hybrid mode, the resource device 14 can evaluate the policy data locally without forwarding the request. The decision whether to forward the request depends on factors such as the contents of the resource request, the status of the policy manager 20 or other factors. If the policy manager 20 is not operational at the time of the resource request, then the resource device 14 can perform the evaluation process locally and bypass the non-operational policy manager.

On other hand, the resource device 14 can forward the resource request to the policy manager 20 so that the policy manager evaluates the resource request and determines whether to grant access. As discussed above, the resource device 14 also can forward the resource request to the policy manager 20 and receive policy data from the policy manager 20. The policy data is then evaluated locally. The hybrid mode of operation can provide the resource device 14 with flexibility in processing resource requests.

The foregoing techniques can allow owners of resource devices 14 and associated resources 15 to participate actively in the definition and enforcement of centrally managed policy data. For example, a particular resource device or resource may contain a specialized feature requiring access control. The holder of the resource can add customized policy for controlling access to the specialized feature to the centralized policy data structure 22. In addition, the techniques can allow resource devices 14 that are dynamically added to a network to configure polices automatically and independently without manual intervention. Moreover, the resource device can inherit access control privileges from the centralized policy data structure 22.

The foregoing techniques can help secure the process of defining and enforcing policy data. A trust relationship can be established between the resource owner and the authorization device 18 using public key cryptography techniques. A unique identifier (e.g., cryptographic hash value) of a public key can be incorporated into the policy data to also function as a global identifier. As a result, the use of public key cryptography can reduce the likelihood of collisions between resource owners when accessing the policy data stored in the centralized policy data structure 22.

The techniques can provide an approach to access control based on the policy data structure instead of heavyweight and domain specific access control mechanisms such as Windows™ NT LAN manager (NTLM) or Kerberos. As a result, a resource owner using the above techniques can access the centralized policy data structure 22 using public key cryptography without needing to log onto the network and present a NTLM or a kerberos password.

Various modifications may be made. For example, other techniques can be used to encrypt policy data over the network. Such techniques include secured socket layer (SSL), transport layer security (TLS) and Internet protocol security (IPSEC). These alternative techniques offer different advantages, features and tradeoffs that should be examined before selecting a particular technique.

Various features of the invention can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer or processor, for configuring and operating the computer when the storage medium is read by the computer to perform the functions described above.

Other implementations are within the scope of the following claims.

What is claimed is:

1. A method comprising:
receiving first policy data associated with a particular resource from a first principal, wherein the first principal is an entity authorized to access a centralized policy data structure associated with the particular resource;
authenticating the first principal;
modifying the centralized policy data structure associated with the particular resource based on the received first policy data if the first principal is authenticated;
receiving second policy data associated with the particular resource from a second different principal, wherein the second different principal is a different entity authorized to access the centralized policy data structure associated with the particular resource; and
modifying the centralized policy data structure associated with the particular resource based on the received second policy data if the second principal is authenticated.

2. The method of claim 1 wherein receiving first policy data includes receiving a first data portion which includes credentials for authenticating access to the particular resource and a second data portion which includes an access control list specifying access permission levels for controlling access to data and operations associated with the particular resource.

3. The method of claim 1 wherein the second principal is an entity separate from the resource owner of the particular resource, and wherein receiving second policy data includes receiving user policy data indicative of allowing supplementary conditional access to the particular resource.

4. The method of claim 1, wherein authenticating the first principal comprises authenticating the first principal using public key cryptography.

5. A method comprising:
receiving from a resource owner a policy query associated with a resource, the policy query including a policy identifier, a resource name, an access control level, and client credentials associated with a client seeking to access the resource;
authenticating the resource owner;
searching for policy data based on the policy identifier;
determining a policy query result indicative of whether the policy data grants the client access to the resource based on the client credentials and the access control level; and returning to the resource owner the policy query result.

6. The method of claim 5 wherein determining the policy query result comprises determining whether the policy data grants the client access to the resource based on an access inheritance at least at the access control level.

7. The method of claim 5 wherein determining the policy query result comprises determining whether the policy data grants the client access to the resource based on the client credentials at least at the access control level.

8. The method of claim 5, wherein authenticating the resource owner comprises including authenticating the resource owner using public key cryptography.

9. An apparatus comprising:
a centralized data structure associated with a particular resource; and
a policy manager to receive policy data associated with the particular resource from a plurality of principals authorized to modify the centralized data structure associated with the particular resource, authenticate the plurality of principals, and in response to receiving first policy data from a first principal of the plurality of principals, modify the centralized data structure associated with the particular resource based on the first policy data.

10. The apparatus of claim 9 wherein the centralized data structure associated with the particular resource includes a first data portion including information indicative of authentication credentials of the plurality of principals authorized to access the centralized data structure associated with the particular resource and a second data portion which includes an access control list including data indicative of access permission levels for controlling access to data and operations associated with the particular resource.

11. The apparatus of claim 9 wherein the centralized data structure associated with the particular resource stores policy data including policy data that grants supplementary conditional access to the particular resource.

12. An apparatus comprising:
a centralized data structure including a plurality of device data structures; and
a processor configured to:
receive from a resource owner of a particular resource a policy query associated with the particular resource, the policy query including a policy identifier, a resource name, an access control level, and client credentials associated with a client seeking to access the particular resource,
authenticate the resource owner to determine whether to accept the policy query, search the centralized data structure for a device data structure associated with the particular resource based on the policy identifier, determine a policy query result indicative of whether the policy data grants the client access to the particular resource based on the client credentials and the access control level, and
return to the resource owner the policy query result.

13. The apparatus of claim 12 wherein the processor is configured to:
search the centralized data structure for a device data structure including user policy data for the particular resource associated with the resource name; and
determine whether the user policy data grants the client access to the particular resource based on an access inheritance at least at the access control level.

14. The apparatus of claim 12 wherein the processor is configured to:
search the centralized data structure for a device data structure including user policy data for the particular resource associated with the resource name; and
determine whether the user policy data grants the client access to the particular resource based on the client credentials at least at the access control level.

15. An article comprising a computer-readable medium that stores computer-executable instructions for causing a computer system to:
authenticate a first principal to determine whether to accept first policy data associated with a particular resource, in response to receiving the first policy data from the first principal; and
modify a centralized device data structure associated with the particular resource using the first policy data, if the first principal is authenticated;
authenticate a second different principal to determine whether to accept second policy data associated with the particular resource, in response to receiving the second policy data from the second principal; and
modify the centralized device data structure associated with the particular resource using the first policy data, if the second principal is authenticated.

16. The article of claim 15, wherein the instructions to authenticate the first principle includes instructions for causing the computer system to authenticate the first principal using public key cryptography.

17. An article comprising a computer-readable medium that stores computer-executable instructions for causing a computer system to:
forward a client request to access a resource associated with a resource owner to a policy manager over a network, in response to receiving the client request from a client;
evaluate policy data received from the policy manager over the network;
determine a policy query result indicative of whether to grant the client access to the resource based on evaluating the policy data; and
return to the resource owner the policy query result.

18. The article of claim 17 wherein the instructions for causing the computer system to determine a policy query result comprise instructions for causing the computer system to determine whether to grant the client access to the resource based on a signal from the policy manager indicating whether to grant access to the client.

19. The article of claim 17 wherein the instructions for causing the computer system to determine a policy query result comprise instructions for causing the computer system to determine whether to grant the client access to the resource based on evaluating local policy data.

* * * * *